INTERLACED FEEDBACK AMPLIFIER

Filed June 27, 1957

INVENTOR
F. H. BLECHER
BY [signature]
ATTORNEY

United States Patent Office 2,909,623

Patented Oct. 20, 1959

2,909,623

INTERLACED FEEDBACK AMPLIFIER

Franklin H. Blecher, Plainfield, N.J., assignor to Bell Telephone Laboratories, Incorporated, New York, N.Y., a corporation of New York Application June 27, 1957, Serial No. 668,545

7 Claims. (Cl. 179—171)

Figure 1:
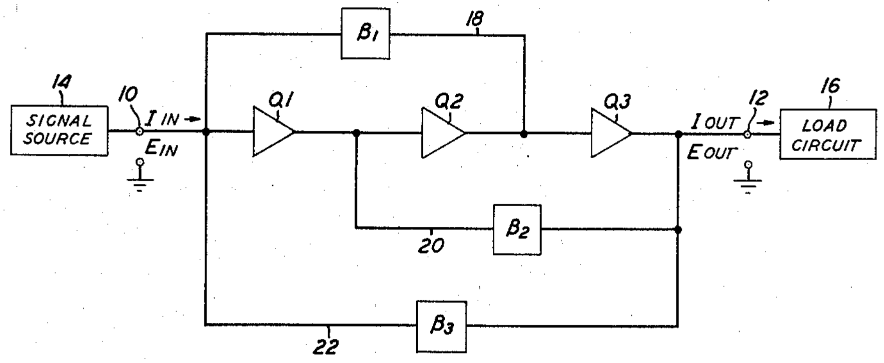

This invention relates to wave translating systems and more particularly to electric wave amplifying systems employing multiple-loop feedback amplifiers.

It is an object of the present invention to effect a pronounced improvement in the gain stability and to increase the length of life of a feedback amplifier system, while decreasing distortion.

A further object of the invention is to simplify the design and construction of such a system.

It is a more specific object of the present invention to provide an extremely reliable multi-stage amplifier system having a current or voltage gain which is not affected by a substantial failure in either the input or output stages of the system. A related object is to eliminate distortion due to the output stage of such an amplifier system while maintaining satisfactory gain stability.

The use of negative feedback in amplifiers to cause a reduction in the over-all gain while improving gain stability and reducing distortion, is well known and is taught, for example, in H. S. Black Patent No. 2,102,671, which issued December 21, 1937. The use of positive feedback in conjunction with negative feedback in multiple-loop feedback amplifiers is also known and is taught, for example, in F. B. Llewellyn Patent No. 2,245,598, which issued June 17, 1941, and Q. E. Greenwood Patent No. 2,281,238, which issued April 28, 1942. Both of the latter references concern feedback amplifier systems wherein each stage has an independent positive local feedback loop and wherein negative feedback is provided from the output of either the last or an intermediate stage to the input of the first stage. The positive feedback loops are independent in the sense that there is no interrelationship between them. As will become apparent below, the present invention concerns feedback systems having interrelated and, therefore, dependent positive feedback loops.

In an illustrative embodiment of the present invention, severe gain degradations in either the input or output stage of a three-stage cascaded feedback amplifier are compensated by introducing a critical amount of positive feedback into individual feedback paths coupling, respectively, the output of the second stage to the input of the first stage and the output of the last stage to the input of the second stage. Thus, the over-all gain of the amplifier is rendered substantially insensitive to such degradations.

A fuller understanding of the nature of the invention and other objects, features and advantages thereof may be had from a consideration of the illustrative embodiments now to be described with reference to the accompanying drawings.

Figure 2:
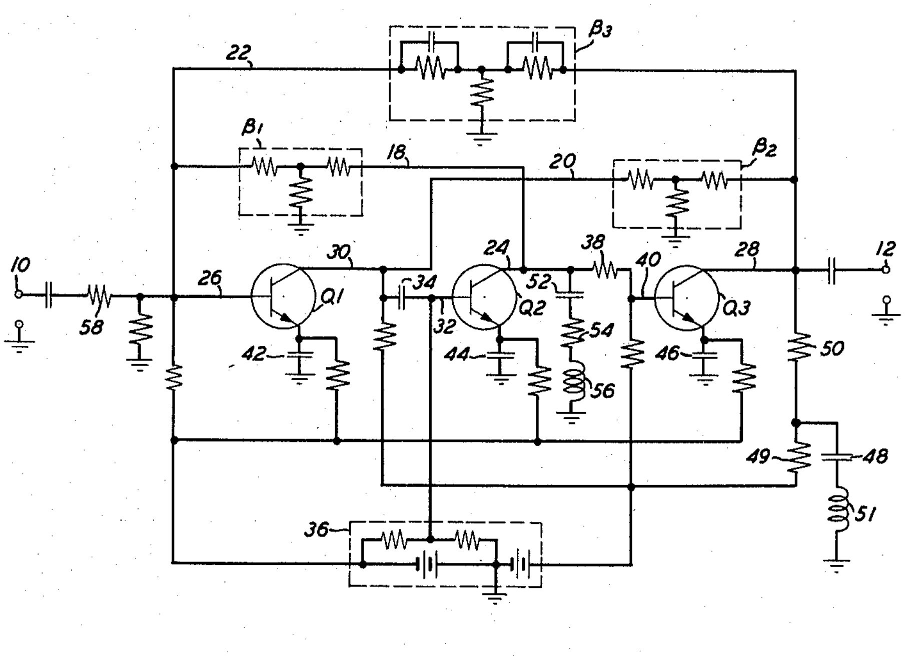

In the drawings:

Fig. 1 is a diagrammatic representation of an interlaced feedback amplifier system embodying the invention; and Fig. 2 is a circuit diagram illustrating a specific transistorized embodiment conforming with the diagrammatic representation of Fig. 1.

In Fig. 1, three amplifying stages $Q_1$, $Q_2$, and $Q_3$ having voltage or current gains $A_1$, $A_2$, and $A_3$, respectively, are connected in cascade and interposed between an input terminal 10 and an output terminal 12. A signal source 14 is connected to the input terminal 10 to supply an input current $I_{in}$ (or voltage $E_{in}$), and a load circuit 16 is connected to the output terminal 12 to receive an output current $I_{out}$ (or voltage $E_{out}$). A positive feedback path 18 having a feedback fraction $\beta_1$ couples the output of stage $Q_2$ to the input of stage $Q_1$ (where "feedback fraction" is understood to mean that fraction of the output current or voltage of a stage which is fed back); a second positive feedback path 20 having a feedback fraction $\beta_2$ couples the output of stage $Q_3$ to the input of stage $Q_2$; and a negative feedback path 22 having a feedback fraction $\beta_3$ couples the output of stage $Q_3$ to the input of stage $Q_1$. The system is thus said to have interlaced positive feedback loops and over-all negative feedback and is identified as an interlaced feedback amplifier system. The loop gain of the loop consisting of the first and second stages $Q_1$ and $Q_2$ and the feedback path 18 may be written as $A_1A_2\beta_1$. Similarly, the loop gains of the loops formed by the feedback paths 20 and 22 may be written as $A_2A_3\beta_2$ and $A_1A_2A_3\beta_3$, respectively.

By recourse to the basic Kirchhoff equations, the over-all or external current or voltage gain of the amplifier system is found to be $$A'=\frac{A_1A_2A_3}{1-A_1A_2\beta_1-A_2A_3\beta_2-A_1A_2A_3\beta_3} \qquad (1)$$

where ordinarily the gains of the individual stages are negative and the feedback fractions are positive.

In accordance with principles of the invention, the loop gains $A_1A_2\beta_1$ and $A_2A_3\beta_2$ are each made substantially equal to unity. The advantage of this may be seen from the over-all gain Equation 1, either by inspection or by partial differentiation. This advantage is that the over-all gain $A'$ is insensitive to changes in the gain $A_1$, so long as the gains $A_2$ and $A_3$ have not varied, and to changes in the gain $A_3$, so long as the gains $A_1$ and $A_2$ have not varied. To obtain this result there are no restrictions on the loop gain $A_1A_2A_3\beta_3$ other than the practical requirements that the feedback be negative and that its absolute magnitude be greater than unity by an amount sufficient to render the system stable in the sense that it will not oscillate. The allowable degradation in either of the gains $A_1$ or $A_3$ without affecting the over-all or external gain of the amplifier, is determined only by stability considerations. Thus, if the system of Fig. 1 is designed to have conservative gain and phase margins against instability without the $\beta_1$ and $\beta_2$ circuits, then either of the gains $A_1$ or $A_3$ may drop to a very small fraction (for example, one percent) of its initial value before causing oscillation.

It is desirable to eliminate distortion in the last stage of an amplifier, since most of the distortion in an amplifier is introduced by this stage. An advantageous property of the circuit shown in Fig. 1 is that output distortion introduced by the last stage $Q_3$ is drastically reduced if the loop gain $A_1A_2\beta_1$ is constrained to equal unity. Moreover, this reduction of distortion is effectively independent of the loop gains $A_2A_3\beta_2$ and $A_1A_2A_3\beta_3$, except that the magnitude of the latter gain, as mentioned above, should be greater than unity by an amount sufficient to render the system stable. Theoretically, it should be noted, the output distortion is completely eliminated, but it is impracticable to constrain $A_1A_2\beta_1$ to exactly unity at all times. Nevertheless, reduction of output distortion in the practice of the invention closely approaches this theoretical ideal.

The use of both positive and negative feedback in an amplifier enables a designer to achieve transmission characteristics that are not obtainable in amplifiers using only negative feedback. However, such an amplifier is conditionally stable. Insofar as vacuum tubes require a substantial warm-up time, they are relatively unsuitable for use in conditionally stable amplifiers. For this reason, positive feedback usually is not employed in vacuum tube amplifiers (although it can be if adequate provision is made for warm-up time). Transistors, on the other hand, are particularly suitable for use in conditionally stable circuits, because they have substantially no warm-up time.

Fig. 2 shows in greater detail an illustrative embodiment of the invention in conformance with the diagrammatic representation of Fig. 1. The interlaced feedback amplifier shown comprises three cascaded N–P–N junction transistor stages $Q_1$, $Q_2$, and $Q_3$, each connected in a common emitter configuration. Positive feedback path 18, including feedback circuit $\beta_1$, interconnects the collector output 24 of transistor $Q_2$ with the base input 26 of transistor $Q_1$. Positive feedback path 20, including feedback circuit $\beta_2$, interconnects the collector output 28 of transistor $Q_3$ with the collector output 30 of transistor $Q_1$ which in turn is coupled to the base input 32 of transistor $Q_2$ through coupling capacitor 34. Negative feedback path 22, which includes feedback circuit $\beta_3$, interconnects the collector output 28 of transistor $Q_3$ with the base input 26 of transistor $Q_1$. Appropriate bias potentials for each of the stages $Q_1$, $Q_2$, and $Q_3$ are provided by bias circuit 36.

It should be noted that although N–P–N transistors in the common emitter configuration are shown, other configurations and transistors of different conductivity types may be used. Moreover, each of the $\beta$ circuits may be active as well as passive and unilateral as well as bilateral.

In the illustrative embodiment of Fig. 2 it is apparent that, but for the insertion of resistor 38 in the connections between the collector output 24 of transistor $Q_2$ and the base input 40 of transistor $Q_3$, degradation of transistor $Q_3$ would substantially affect the amount of current fed back through feedback path 18. Consequently, the value of resistor 38 should be at least an order of magnitude greater than the input impedance of transistor $Q_3$.

An important consideration in the design of feedback amplifiers is that of shaping the gain characteristic, i.e., controlling the rate at which the current or voltage gain of the amplifier falls off at frequencies outside the useful fraquency band, in order to provide the maximum amount of negative feedback consistent with stability requirements. In the illustrative embodiment of Fig. 2, low frequency shaping of the loop current transmission is provided by capacitors 42, 44, and 46, each of which is connected between the emitter of its respective transistor and ground. Low frequency shaping is also provided by capacitor 48 in conjunction with resistors 49 and 50. High frequency shaping of the loop current transmission is provided by the $\beta_3$ circuit and an interstage shaping network comprising the series combination of capacitor 52, resistor 54, and inductor 56, the combination being connected between the collector 24 of transistor $Q_2$ and ground. High frequency shaping is also provided by inductor 51 in conjunction with resistors 49 and 50.

In order to stabilize the positive feedback in the amplifier, the negative feedback loop is designed for relatively large phase and gain margins. In addition, at frequencies outside the useful frequency band, the magnitude of the loop gain of each of the positive feedback loops must decrease at a rate which is equal to or greater than the rate at which the magnitude of the loop gain of the negative feedback loop decreases. The illustrative embodiment of Fig. 2 has a 45 degree phase margin at both the low and high frequency ends of the useful frequency band.

The aforementioned shaping circuits serve to shape the loop gain of each of the positive feedback loops as well as the negative feedback loop and, therefore, there is no need for shaping elements in the $\beta_1$ and $\beta_2$ circuits. Accordingly, the $\beta_1$ and $\beta_2$ circuits may be purely resistive.

Input resistor 58 is serially inserted in the connections between the input terminal 10 of the amplifier and the base input 26 of transistor $Q_1$, primarily to insure that currents fed back through the feedback paths 18 and 22 are substantially fed into the base input 26 of transistor $Q_1$. The relatively high output impedance presented by the collector-emitter path of transistor $Q_1$ insures that substantially all of the current fed back through feedback path 20 is fed into the base input 32 of transistor $Q_2$.

The illustrative embodiment of Fig. 2 has the advantageous property that if either the input transistor $Q_1$ or the output transistor $Q_3$ fails by a factor as large, for example, as one hundred (i.e., if the current gain of either transistor drops to as low, for example, as one percent of its normal value), the over-all or external gain nonetheless remains substantially unaffected. The compensation for degradations in either the input transistor $Q_1$ or the output transistor $Q_3$ is therefore substantially perfect over the transmission band for which the amplifier is designed. Moreover, simultaneous degradation of transistors $Q_1$ and $Q_3$ will have a lesser effect on the external gain of the illustrative amplifier of Fig. 2 than such degradation would have in the case of a single loop version of this amplifier (for the single loop version, $\beta_1$ and $\beta_2$ would be equal to zero).

Although the present invention has been described with reference to a specific embodiment, it should be considered as illustrative, for the invention comprehends also such other embodiments as come within its spirit and scope.

What is claimed is:

1. An amplifier comprising an odd number of tandem connected stages, a first positive feedback path extending around at least two of said stages, a second positive feedback path extending around at least two of said stages and interlaced with said first feedback path, each of said feedback paths forming a loop with its associated enclosed stages, the gains of said loops, each being substantially equal to unity, and a negative feedback path extending around all of said stages.

2. An amplifier comprising an odd number of tandem connected stages, each of said stages comprising a junction transistor having an input and an output and having base, emitter and collector electrodes interconnected in the common-emitter configuration, a first positive feedback path feeding back a fracition $\beta_1$ from the output of the second of said stages to the input of the first of said stages, a second positive feedback path feeding back a fraction $\beta_2$ from the output of the third of said stages to the input of the second of said stages, a negative feedback path feeding back a fraction $\beta_3$ from the output of the third of said stages to the input of said first stage, said first, second and third stages having gains, respectively, of $A_1$, $A_2$, $A_3$, wherein the products $A_1A_2\beta_1$ and $A_2A_3\beta_2$ are each substantially equal to unity and wherein the product $A_1A_2A_3\beta_3$ is negative and large in magnitude compared to unity.

3. In a wave translating system comprising cascaded first, second, and third amplifying stages each having an input and an output, first positive feedback means coupling the output of said second stage with the input of said first stage, second positive feedback means coupling the output of said third stage with the input of said second stage, and negative feedback means coupling the output of said third stage with the input of said first stage, the feedback loop comprising said first and second stages and said first positive feedback means and the feedback loop comprising said second and third stages and said second positive feedback means each having substantially unity loop gain.

4. In a wave translating system comprising cascaded first, second, and third amplifying stages each having an input and an output, first positive feedback means coupling the output of said second stage with the input of said first stage, second positive feedback means coupling the output of said third stage with the input of said second stage, and negative feedback means coupling the output of said third stage with the input of said first stage, the feedback loop comprising said first and second stages and said first positive feedback means and the feedback loop comprising said second and third stages and said second positive feedback means each having substantially unity loop gain, and the feedback loop comprising said first, second, and third stages and said negative feedback means having a loop gain whose absolute magnitude is greater than unity.

5. An amplifier having an input and an output comprising cascaded first, second and third transistors each having an input and an output, first positive feedback means interconnecting the output of said second transistor with the input of said first transistor, second positive feedback means interconnecting the output of said third transistor with the input of said second transistor, and negative feedback means interconnecting the output of said third transistor with the input of said first transistor, the feedback loop comprising said first and second transistors and said first positive feedback means and the feedback loop comprising said second and third transistors and said second positive feedback means each having substantially unity loop gain.

6. An amplifier having an input and an output comprising cascaded first, second, and third transistors each having an input and an output, a signal source for supplying signal waves to said input of said amplifier, an output circuit for receiving waves from said output of said amplifier, means for supplying appropriate bias potentials for said transistors, positive feedback means interconnecting the output of said second transistor with the input of said first transistor, positive feedback means interconnecting the output of said third transistor with the input of said second transistor, and negative feedback means interconnecting the output of said third transistor with the input of said first transistor, the feedback loop comprising said first and second transistors and said first positive feedback means and the feedback loop comprising said second and third transistors and said second positive feedback means each having substantially unity loop gain.

7. An amplifier in accordance with claim 6 wherein the feedback loop comprising said first, second, and third transistors and said negative feedback means has a loop gain whose absolute magnitude is greater than unity.

References Cited in the file of this patent

UNITED STATES PATENTS

| | | |
|---|---|---|
| 2,657,282 | Te Winkel | Oct. 27, 1953 |
| 2,763,732 | Rockwell | Sept. 18, 1956 |

FOREIGN PATENTS

| | | |
|---|---|---|
| 164,807 | Australia | Aug. 24, 1955 |

OTHER REFERENCES

Shea: "Principles of Transistor Circuits," September 1953, page 351. (Copy in Division 69.)

Langford-Smith: "Radiotron Designer's Handbook," fourth edition, 1952, pp. 354, 355. (Copy in Division 69.)